INVENTORS
CARL A. GRULKE
ROBERT A. POWERS
BY
ATTORNEY

United States Patent Office 3,494,796
Patented Feb. 10, 1970

3,494,796
GALVANIC DRY TAPE CELL CONSTRUCTION
Carl A. Grulke, Berea, and Robert A. Powers, Lakewood, Ohio, assignors to Union Carbide Corporation, a corporation of New York
Continuation-in-part of application Ser. No. 449,947, Apr. 22, 1965. This application Feb. 8, 1968, Ser. No. 704,156
The portion of the term of the patent subsequent to Apr. 23, 1985, has been disclaimed
Int. Cl. H01m 35/00, 35/08
U.S. Cl. 136—83       3 Claims

ABSTRACT OF THE DISCLOSURE

A galvanic primary cell construction in the form of a thin, flexible tape adapted to feed past current collectors through which an external voltage may be derived, with all the active elements enclosed from atmospheric contact by carrier sheets having sealed edges, and with elements of the structure, including the anode and cathode materials, arranged as separated, discrete layers to form a plurality of individual cells spaced along the tape length.

---

This application is a continuation-in-part of copending application Ser. No. 449,947, now Patent 3,379,574, filed Apr. 22, 1965, having the same inventors and assigned to the same assignee as the present invention.

The present invention relates to galvanic primary dry-tape cell systems; and more specifically, to a construction wherein the electrochemically active materials are embodied within an elongated, hermetically sealed, thin, flexible tape or envelope having discrete individual cells spaced therealong.

Galvanic primary dry-tape cell systems have already been proposed in which a number of continuous or elongated, thin, flexible tapes embodying the electrochemically active materials are fed from a separate or independent supply to current collector means, suitably a pair of oppositely spaced current collector plates or the like. For example, in one such system, the cathode and electrolyte materials have been respectively embodied or carried on separate tapes which are continuously fed to the current collector plates, one of which is composed of the anode material. Electrical current is produced when the tapes are continuously fed between the current collector plates, which current may be continuously supplied to a desired load circuit or to an electrical appliance to be energized.

Such dry-tape cell systems have been primarily characterized by their lightweight, high surface area thin electrode construction and by their high energy density-to-weight ratio. In addition, these dry-tape cell systems have proven capable of continuous and highly efficient performance and can be operated within a minimum amount of space. Despite these distinct advantages, however, those dry-tape cell constructions thus far produced have been somewhat limited in their practical use and application. One factor which has limited the use of these systems has been the necessity of employing separate tapes to embody or carry the electrochemically active materials. Because of this limitation, all of the active materials have been exposed to the atmosphere during the operation of the primary dry-tape cell system with the result that the materials have been contaminated or even totally lost due to evaporation or oxidation. Storage of the tapes has also been a troublesome problem for basically the same reasons.

In copending application Ser. No. 449,947 there is disclosed and claimed a novel and improved galvanic primary dry-tape cell construction in which all of the electrochemically active materials are provided within a single, hermetically sealed, thin, flexible tape or envelope enclosed from atmospheric contact. Although the specific embodiment described in said copending application comprises a continuous electrode, it is stated therein that variations and modifications of the specific structure described are possible, one such modification being an arrangement wherein the layer of anode material and the layer of cathode material are provided in the form of individual segments disposed along the tape construction.

The present invention may be briefly described as a specific construction for a galvanic primary dry-tape cell system comprising an elongated, hermetically sealed, thin flexible tape wherein all of the electrochemically active materials are enclosed from atmospheric contact with structural elements of the system, including the anode and cathode elements, being discontinuously arranged to form separate discrete cells along the length of the tape system.

The invention will be better understood by reference to the following detailed description taken in connection with the accompanying drawings, in which.

Figure 1:
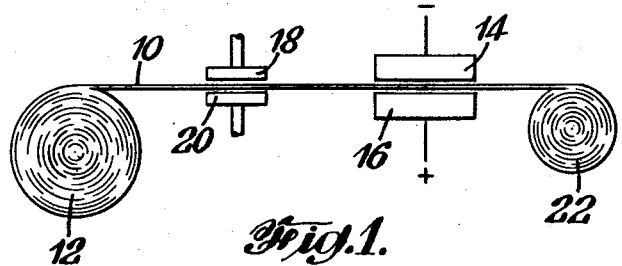
FIGURE 1 is a schematic diagram of the galvanic primary dry-tape cell system of the invention.

Referring to the drawings, FIGURE 1 schematically illustrates a primary dry-tape cell system in the form of an elongated, hermetically sealed, thin flexible tape 10 conveniently stored in the form of a roll 12, although a source of supply in a different form could be used. From the roll 12 or other source of supply, the elongated tape 10 is continuously fed to current collector means, suitably a pair of current collector plates 14, 16. These plates 14, 16 may be composed of metal or any other conductive material. For the purpose of activating the reserve-type dry-tape cells of the invention, to be hereinafter described, a pair of pressure plates 18, 20 may be provided just ahead of the current collector plates 14, 16. Although not shown in FIGURE 1, the tape 10 is provided with a conductive surface on each of its sides for the purpose of maintaining electrical contact with the current collector plates 14, 16. Upon passage between the plates 14, 16, the cells of the tape 10 are discharged and an electrical current is produced that can be supplied by means of suitable leads to any desired load circuit.

Figure 2:
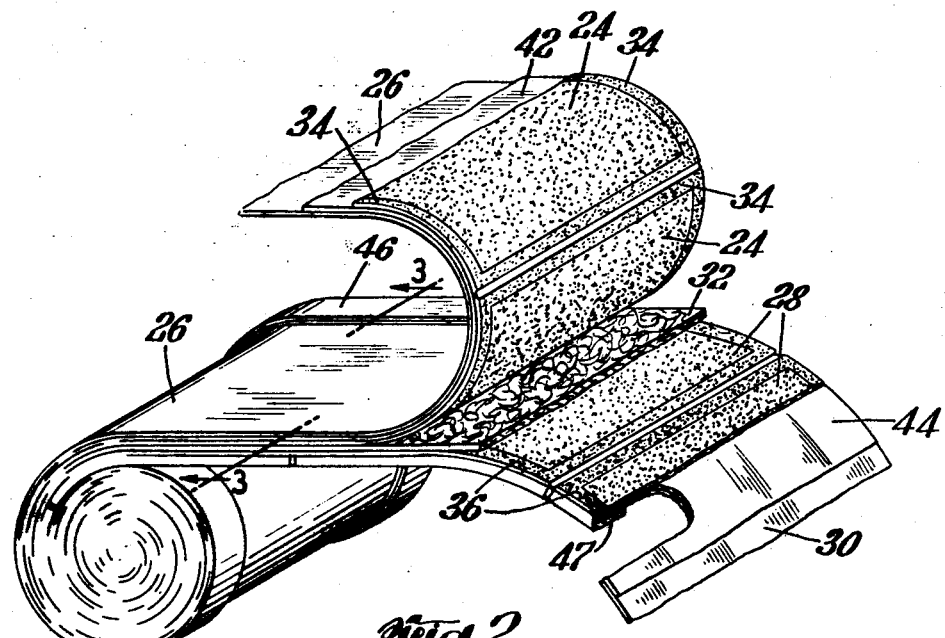
FIGURE 2 is a perspective view of an embodiment of the primary dry-tape cell of the invention, parts being broken away to show details of construction.
Figures 3, 4:
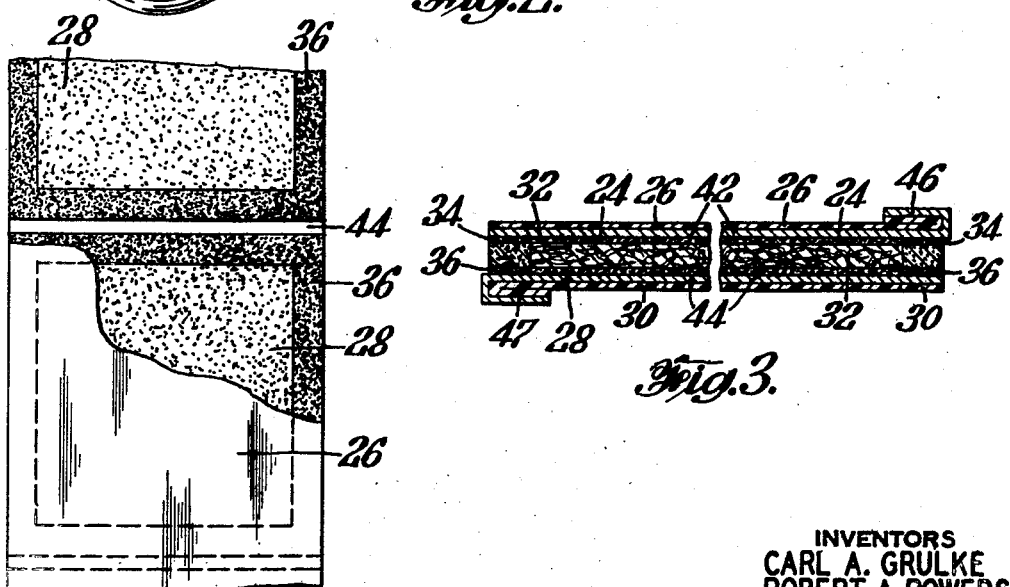
FIGURE 3 is a sectional view of the cell taken along the line 3—3 in FIGURE 2.
FIGURE 4 is a planar view of the invention, parts being broken away to show details of the structural configuration thereof.

In FIGURES 2 and 3, there is illustrated one embodiment of the dry-tape cell construction of the invention. As shown, the tape 10 is a multiple layer or laminate structure comprising a series of layers of an anode material 24, arranged as a series of discrete forms, e.g. squares, supported on a suitable carrier sheet 26, and a series of layers of cathode material 28, each coterminous with an anode layer 24, supported on the carrier sheet 30. Between the layers of anode material 24 and cathode material 28 is an intermediate layer of a bibulous separator material 32 impregnated with an electrolyte. Suitable separator materials include a wide variety of cellulosic or fibrous sheets conventionally used in the art.

The carrier sheets 26, 30 may be composed of a non-conductive plastic film material in the form of a thin, elongated ribbon or the like. Additionally, the carrier sheets 26, 30 comprise conductive surfaces which, as indicated above, are provided on both sides of the dry-tape cell construction for maintaining electrical contact with the pair of current collector plates 14, 16. The conductive surface may be achieved upon the carrier sheets in a number of ways in accordance with the invention. For example, in the embodiment of FIGURES 2 and 3, elongated strips of metal foil 42, 44 are provided, each of which are suitably adhered, respectively, to carrier sheets 26 and 30, by means of an adhesive or the like.

The foil strips 42, 44 are then turned over the peripheral edges of the carrier sheets 26, 30, respectively, and lie flat against the opposite sides thereof as generally indicated at 46 and 47. Suitably, the metal foil may be composed of tin, aluminum, zinc or other suitable conventional metal compatible with the cell system. It may be mentioned that in the instance of the foil strip 44 which makes electrical contact with the layer of cathode material 28, a conductive coating of a carbon-in-resin composition should be applied over the foil strip 44 in order to prevent direct contact and shorting between the metal foil and the depolarizer. The foil strips 42, 44 may be provided as discontinuous discrete forms, e.g. squares, coterminous with anode and cathode layers 24, 28.

The anode material 24 may be provided onto one side of the carrier sheet 26 over the metal foil 42 in the form of finely divided particles or powders of one of the conventional anode metals such as zinc, cadmium, aluminum or magnesium. Metal evaporation or other suitable techniques for forming the thin anode layer are well known in the art.

The cathode material 28 is provided in the form of a thin porous layer of finely divided particles or powders of, for example, one of the conventional oxidic depolarizers such as manganese dioxide or the oxides of silver, copper and lead. Suitably, a mixture of the oxidic depolarizer and a conductive material such as graphite or acetylene black may be employed. The cathode material 28 may be provided on the carrier sheet 30 by means of so-called printing techniques well known in the art. Such printing techniques involve the use of a paste containing the cathode material, a binder, and a volatile solvent which is evaporated, leaving behind a residue or thin deposit of the cathode material which is firmly bonded to the carrier sheet 30.

As more clearly shown in FIGURE 2, the laminates containing the anode material 24 and the cathode material 28 are sealed directly in contact with the intermediate layer of separator material 32 by means of thin narrow marginal seal layers as indicated at 34 and 36. These mrginal seal layers are adhered to the peripheral edges of the carrier sheets 26, 30 and preferably penetrate through the edges of the separator 32 in a manner whereby the layers of anode material 24 and cathode material 28 are hermetically enclosed or enveloped from atmospheric contact. Furthermore, as a result of the action of the marignal seal layers 34 and 36 to penetrate the separator material, a tendency develops to prevent electrolyte bridging thereby maintaining the electrolyte for one cell separate from the electrolyte for an adjacent cell. Suitable adhesive materials include a wide variety of nonconductive adhesive cements such as a vinyl resin composition.

The basic contribution of the present invention over that described and claimed in copending application Ser. No. 449,947 is that there is herein provided the specific structure relating to the specific embodiment of the invention having structural elements of the system, including the anode and cathode materials, in the form of individual segments disposed along the tape construction to provide a series of discrete cells. As depicted in FIGURE 2, this may be accomplished by providing discrete layers of anode material 24 and cathode material 28 each, respectively, having its periphery bounded by the marginal seal layers 34 or 36. The seal layers 34 and 36 provide the sealing effect described in said copending application as well as separation of electrolyte from one cell to an adjacent cell, and there is provided by the construction herein described a series of galvanic primary cells with all the active elements thereof enclosed from atmospheric contact, the entire assembly being in the form of a thin, flexible, sealed tape of an extended length capable of providing discrete sources of electrical output therealong.

As indicated in FIGURE 4, each individual cell may be shaped in a square form, but other forms, e.g. rectangular, may be provided.

In the practice of the invention, the carrier sheets used in the various embodiments described may be composed of any plastic film material such as phenoxy, styrene and polyethylene. The electrolyte may be any one of the conventional electrolyte solutions such as potassium hydroxide and may be provided in gel form if desired. However, the preferred electrolyte for use in the invention is one of the class of "polyelectrolytes" or those polymeric structures capable of carrying ionic charges. Suitable polyelectrolyte materials include polyacrylyl urea co-reacted with oxamide, maleimide, malonimide or ethylenediamine.

In the operation of the device the tape 10 may be fed past the current collectors 14 and 16 in an intermittent manner, thereby permitting each individual cell defined by a square of anode material 24 and cathode material 28 to pass between current collectors 14, 16 and remain so positioned with sufficient dwell time to allow discharge thereof prior to placement of the next cell in discharging position. It will be apparent that for each discharging position an appropriate segment of foil strips 42, 44 will be in contact with an appropriate current collector 14, 16. In this mode of operation, the output from the tape 10 achieved through current collectors 14, 16 is of a pulse-like nature thereby enabling expanded versatility in the utilization and application of the invention. Due to the fact that the tape 10 is constructed with separated, discrete cells, certain capabilities will be produced in the system of the invention enabling a variety of modifications and uses within the scope of the invention. For example, a series of current collectors such as 14 and 16 could be arranged along the tape and connected in a parallel circuit arrangement to permit a plurality of cells to be discharged simultaneously thereby giving increased output. Further, the foil contact strips 42, 44 may be interconnected to provide either series or parallel interconnection of cells. For example, several strips 42 on one side of the tape 10 could be interconnected with each other, with an equal number of strips 44 on the opposite side of tape 10 being similarly interconnected, thereby providing a parallel circuit connection between the cells involved. Of course, such an interconnection could be accomplished merely by making foil strips 42, 44 continuous for a specified length.

In a similar fashion, cells could be joined in a series circuit arrangement by connecting together a strip 42 with a next adjacent strip 44, with any specified number of cells being joined by this mode of series connection. Thus, the anode of one cell would be joined to the cathode of a next adjacent cell for as many cells as may be desired.

Additionally, if desired, more than one layer of anode and cathode material may be provided at each cell location, all layers being coterminous with each other, e.g. in a bipolar electrode arrangement. The thickness of these multilayer constructions should not be so great as to detract from the flexibility of the tape system. Alternatively, a number of sealed tapes carrying single cell layers could be supplied simultaneously to the current collectors.

The dry-tape cell constructions thus far described have been characterized by the fact that the electrolyte is impregnated within the layer of separator material. Although not shown in the drawings, it is possible to provide a reserve-type dry-tape cell construction by suitably disposing a number of rupturable capsules containing the electrolyte along the tape construction. Desirably, a capsule should be placed at each layer pair of anode and cathode 24, 28 between two layers of the separator material 32 for even distribution of the electrolyte upon activation. As already indicated, the reserve-type dry-tape cell of the invention may be activated by breaking the capsule between the pressure plates 18, 20 just prior to discharge as shown in FIGURE 1.

What is claimed is:

1. In a galvanic primary dry-tape cell system, an improved dry-tape cell construction comprising in combination therewith, a plurality of layers of an anode material, a plurality of layers of a cathode material, an intermediate layer of a separator material and an electrolyte material, said layers of anode and cathode material being supported on carrier sheets and separately spaced apart therealong to form individual discrete cells, and external means for making electrical contact with said layers of anode and cathode material, said carrier sheets being sealed at the peripheral edges thereof to enclose said layers of anode and cathode material and said separator and electrolyte material, said carrier sheets and said layers of anode, cathode and separator material being arranged along an extended length and providing a thin, flexible, sealed tape construction having all of the active elements of said cells enclosed from atmospheric contact in a sealed configuration and adapted to be continuously intermittently fed to current collector means of said system, said anode and cathode materials being in direct contact with said separator and carrier sheet.

2. The improved dry-tape cell construction of claim 1 wherein each of said layers of anode and cathode material are of a square configuration with each layer of anode material being coterminous with a layer of cathode material.

3. The improved dry-tape cell construction of claim 1 comprising an adhesive sealing material bounding the periphery of each of said layers of anode and cathode material, said sealing material separating each layer of anode and cathode material, respectively, from an adjacent layer of anode or cathode material and providing in cooperation with said carrier sheets enclosure of said active elements from atmospheric contact.

References Cited

UNITED STATES PATENTS 3,293,080   12/1966   Gruber et al. _____ 136—83

WINSTON A. DOUGLAS, Primary Examiner

C. F. LEFEVOUR, Assistant Examiner

U.S. Cl. X.R.

136—6